United States Patent
Yang et al.

(10) Patent No.: US 10,110,018 B2
(45) Date of Patent: Oct. 23, 2018

(54) WIRELESS POWER REPEATING

(71) Applicant: Intel Corporation, Santa Clara, CA (US)

(72) Inventors: Songnan Yang, San Jose, CA (US); Essam Elkhouly, Santa Clara, CA (US); Karim H. Tadros, Santa Clara, CA (US); Xintian E. Lin, Mountain View, CA (US); Sreenivas Kasturi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 743 days.

(21) Appl. No.: 14/580,609

(22) Filed: Dec. 23, 2014

(65) Prior Publication Data
US 2016/0181822 A1  Jun. 23, 2016

(51) Int. Cl.
| | |
|---|---|
| H01F 38/00 | (2006.01) |
| H02J 5/00 | (2016.01) |
| H02J 7/02 | (2016.01) |
| H02J 50/10 | (2016.01) |
| H02J 50/80 | (2016.01) |
| H02J 50/50 | (2016.01) |
| H02J 50/12 | (2016.01) |

(52) U.S. Cl.
CPC .............. *H02J 5/005* (2013.01); *H02J 7/025* (2013.01); *H02J 50/10* (2016.02); *H02J 50/50* (2016.02); *H02J 50/80* (2016.02); *H02J 50/12* (2016.02)

(58) Field of Classification Search
CPC ................................. H02J 5/005; H02J 7/025
USPC .......................................................... 307/104
See application file for complete search history.

(56) References Cited

U.S. PATENT DOCUMENTS

| | | | |
|---|---|---|---|
| 7,180,265 B2 | 2/2007 | Naskali et al. | |
| 8,185,755 B2 | 5/2012 | Yamasuge | |
| 8,552,594 B2 | 10/2013 | Wada et al. | |
| 2006/0087282 A1 | 4/2006 | Baarman et al. | |
| 2006/0091960 A1 | 5/2006 | Phillips et al. | |
| 2009/0079268 A1* | 3/2009 | Cook | H01Q 1/248 307/104 |
| 2009/0096413 A1 | 4/2009 | Partovi et al. | |

(Continued)

FOREIGN PATENT DOCUMENTS

| | | |
|---|---|---|
| CN | 103718426 A | 4/2014 |
| EP | 2056426 A2 | 5/2009 |

(Continued)

OTHER PUBLICATIONS

European Search Report, for EP Application No. 16165888, dated Sep. 28, 2016, 16 pages.

(Continued)

*Primary Examiner* — Alfonso Perez Borroto
(74) *Attorney, Agent, or Firm* — International IP Law Group, P.L.L.C.

(57) ABSTRACT

Techniques for wireless charging in a system, method, and apparatus are described herein. For example, the apparatus includes a first wireless power receiving coil configured to receive power from a first wireless power transmitting coil of a wireless charger. The apparatus also includes a second wireless power transmitting coil coupled to the first wireless power receiving coil, wherein the second wireless power transmitting coil is configured to propagate current resulting in a magnetic field.

25 Claims, 9 Drawing Sheets

(56) References Cited

U.S. PATENT DOCUMENTS

| | | |
|---|---|---|
| 2010/0146308 A1 | 6/2010 | Gioscia et al. |
| 2010/0148939 A1 | 6/2010 | Yamada et al. |
| 2010/0194206 A1 | 8/2010 | Burdo et al. |
| 2010/0217353 A1 | 8/2010 | Forsell |
| 2010/0259215 A1 | 10/2010 | Sip |
| 2010/0277120 A1 | 11/2010 | Cook et al. |
| 2011/0115430 A1 | 5/2011 | Saunamaki |
| 2012/0176317 A1 | 7/2012 | Jin |
| 2012/0223595 A1 | 9/2012 | Oodachi et al. |
| 2013/0043734 A1 | 2/2013 | Stone et al. |
| 2013/0093390 A1 | 4/2013 | Partovi |
| 2013/0119773 A1 | 5/2013 | Davis |
| 2013/0134794 A1 | 5/2013 | Lee et al. |
| 2013/0187474 A1 | 7/2013 | De Boodt |
| 2013/0225104 A1 | 8/2013 | Ahn et al. |
| 2013/0300205 A1* | 11/2013 | Tzanidis ............. H04B 5/0037 307/104 |
| 2014/0044293 A1 | 2/2014 | Ganem et al. |
| 2014/0139037 A1 | 5/2014 | Sasha et al. |
| 2014/0191586 A1 | 7/2014 | Ichikawa |
| 2014/0225563 A1 | 8/2014 | Ichikawa et al. |
| 2014/0240057 A1 | 8/2014 | Low et al. |
| 2014/0246920 A1 | 9/2014 | Bae |
| 2014/0247006 A1 | 9/2014 | Yu |
| 2014/0339910 A1 | 11/2014 | Sealy |
| 2015/0084427 A1 | 3/2015 | Moon et al. |
| 2015/0097443 A1* | 4/2015 | Moyer ................... H02J 7/025 307/104 |
| 2015/0102680 A1 | 4/2015 | Menegoli |
| 2015/0117161 A1 | 4/2015 | Nichol |
| 2015/0340902 A1 | 11/2015 | Luukkainen et al. |
| 2016/0181851 A1 | 6/2016 | Porat et al. |
| 2016/0352133 A1 | 12/2016 | Saunamaki |

FOREIGN PATENT DOCUMENTS

| | | |
|---|---|---|
| JP | H04185236 A | 7/1992 |
| JP | 2004033596 A | 2/2004 |
| JP | 2010014531 A | 1/2010 |
| KR | 20100026075 A | 3/2010 |
| KR | 20100026075 | 3/2012 |
| KR | 20120129821 A | 11/2012 |
| WO | 2010093997 A1 | 8/2010 |
| WO | 2012177283 A1 | 12/2012 |
| WO | 2014178575 A1 | 11/2014 |

OTHER PUBLICATIONS

International Search Report, PCT No. PCT/US2015/054833, dated Jan. 25, 2016, 3 pages.

Woodford, Chris, "Induction Chargers", 2007 (the year of publication is sufficiently earlier than the effective U.S. filing date and any foreign priority date so that the particular month of publication is not in issue in accordance with MPEP § 609.04)a)), Last Updated on Nov. 13, 2014, retrieved from http://www.explainthatstuff.com/inductionchargers.html. [Accessed on Mar. 20, 2015] 8 pages.

Supplemental European Search Report for EP Application No. EP15873870, with a completion date of May 31, 2018, 3 pages.

Supplemental European Search Report for EP Application No. EP15873869, with a completion date of Jul. 9, 2018, 3 pages.

* cited by examiner

WIRELESS POWER REPEATING

TECHNICAL FIELD

This disclosure relates generally to techniques for wireless charging. Specifically, this disclosure relates to wireless power repeating.

BACKGROUND ART

A basic wireless charging system may include a wireless power transmitter unit (PTU) and a wireless power receiving unit (PRU). For example, a PTU may include a transmit (Tx) coil, and a PRU may include receive (Rx) coil. Magnetic resonance wireless charging may employ a magnetic coupling between the Tx coil and the Rx coil. As computing devices such as wearable computing devices become increasingly popular, wireless charging systems may be implemented as charging systems for the computing devices as opposed, or even in addition, to traditional wired charging systems. However, in some cases, it may be challenging for the PTU to provide a uniform charging space that is simultaneously optimized for laptops, tablets, phones, wearable devices, among others.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for wireless charging. Specifically, the techniques described herein include a wireless power repeater. As discussed above, it may be challenging for the PTU to provide a uniform charging space that is simultaneously optimized for laptops, tablets, phones, wearable devices, among others. The techniques described herein include a wireless power repeater that is configured to receive power from the PTU and retransmit the power to a device to be charged including a PRU. In some cases, the repeater may be implemented in a way that increases distributes a magnetic field such that devices to be charged having various shapes may receive power as magnetic flux is received a PRU including a wireless power receiving coil of each device.

For example, the wireless power repeater may be formed in a concave bowl shape. In this scenario, the shape of the bowl shaped repeater may distribute the magnetic field. However, the wireless power repeater need not be bowl shaped. In some cases, as discussed in more detail below, the wireless power repeater may itself be integrated in a device to be charged. In this scenario, the wireless power repeater may be used to provide power to the device to be charged as well as any additional devices to be charged that are near the device to be charged that integrates the wireless power repeater.

In some cases, the techniques discussed herein may be implemented using a wireless charging standard protocol, such as the specification provided by Alliance For Wireless Power (A4WP) version 1.2.1, May 7, 2014. A wireless power receiving (Rx) coil may be a component in a power receiving unit (PRU), while a wireless power transmitting (Tx) coil may be a component in a power transmitting unit (PTU), as discussed in more detail below.

Figure 1:
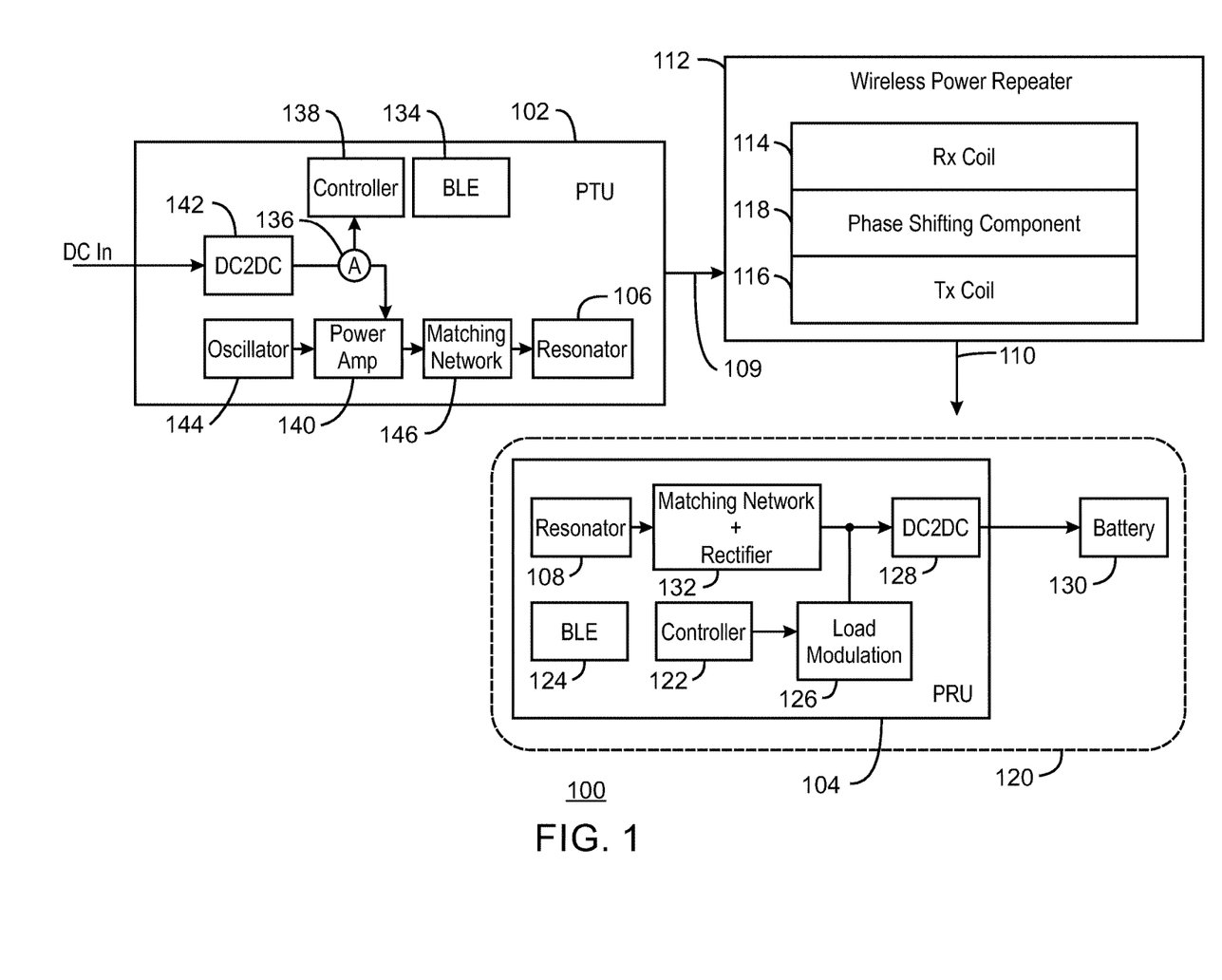
FIG. 1 is block diagram of a PTU to provide power to a PRU through a wireless power repeater.

FIG. 1 is block diagram of a PTU to provide power to a PRU through a wireless power repeater. A PTU 102 may couple to a PRU 104 via magnetic inductive coupling between resonators 106, and 108, as indicated by the arrow 110. The resonator 106 may be referred to herein as a Tx coil 106 of the PTU 102. The resonator 108 may be referred to herein as Rx coil 108 of the PRU 104.

As discussed above, wireless power is provided from the PTU 102 to the PRU 104 through a wireless power repeater 112. The wireless power repeater 112 may include an Rx coil 114, a Tx coil 116, and a phase shifting component 118. As current propagates through the Tx coil 106 of the PTU, a magnetic field is generated having a magnetic flux received at the Rx coil 114 of the wireless power repeater 112, as indicated at 109. The magnetic flux 109 received at the Rx coil 114 generates a current to be provided to the Tx coil 116 of the wireless power repeater 112. As current is received at the Tx coil 116 of the wireless power repeater, another magnetic field is generated having magnetic flux, as indicated at 110. The magnetic flux 110 is received at the Rx coil 108 of the PRU 104.

The phase shifting component 118 may couple the Rx coil 114 to the Tx coil 116 of the wireless power repeater 112. The phase shifting component 118 may ensure that an impedance inversion is generated by the wireless power repeater 112. In some cases, the phase shifting component 118 may enable a constant current source to be provided from the PTU 102. In some cases, the phase shifting component 118 may be configured to enable multiple PRUs, such as the PRU 104 to receive power from the wireless power repeater 112. Examples of the phase shifting component 116 may include an impedance transformer as discussed in more detail below, a transformer, and a quarter wavelength transmission line, among others.

The Rx coil 108, as well as other components of the PRU 104 discussed below, may be embedded in a device, as indicated at the dashed box 120. The device 120 may be a wearable device, such as a smart watch, smart bracelet, smart necklace, smart glasses, a power propagating device, and the like. As discussed in more detail below in regard to FIG. 7, the wireless power repeater 112 may be integrated within the device 120, and may be configured to both provide power to the device 120, as well as retransmit power to another device (not shown) having a PRU, such as the PRU 104.

The PRU 104 may include a controller 122 configured to detect current received at the Rx coil 108 resulting from an inductive coupling between the Tx coil 106, the wireless power repeater 112, and the Rx coil 108. In some cases, the controller 122 may be configured to initiate a wireless data broadcast indicating a resonant frequency of the Rx coil 108.

The wireless data transmission component may be Bluetooth Low Energy (BLE) module 124 in some cases. In some cases, the wireless data transmission component may be integrated as operations of the controller 114, a load modulation circuit 126, a direct current to direct current (DC2DC) converter 128, or any combination thereof, wherein the data transmission may be indicated by patterns in the load modulation.

As illustrated in FIG. 1, the DC2DC converter 128 provides a DC output to a battery 130, or another current/power consuming component. The DC2DC converter 130 may convert DC received as a result of the inductive coupling of the Tx coil 106, the wireless power repeater 112, the Rx coil 108, and a rectifier 132.

The PTU 102 may include a BLE module 134 configured to communicate with the BLE module 124. The PTU 102 may also include a current sensor 136, a controller 138, a power amplifier 140, a DC2DC converter 142, an oscillator 144, and a matching network 146. The current sensor 136 may be an ampere meter, a volt meter, or any other meter configured to sense load variations occurring due to inductive coupling between the PTU 102 and another object, such as the PRU 104. The current sensor 136 may provide an indication of load change to the controller 138 of the PTU 102. The controller 138 may power on the power amplifier 140 configured to receive direct current (DC) from the DC2DC converter 142, and to amplify and oscillate the current. The oscillator 144 may oscillate the power provided at a given frequency and a matching network 146 may be used to match the amplified oscillation provided to the resonator 106 of the PTU 102.

The block diagram of FIG. 1 is not intended to indicate that the PTU 102, the PRU 104, and/or the wireless power repeater 112 are to include all of the components shown in FIG. 1. Further, the PTU 102, the PRU 104, and/or the wireless power repeater 112 may include any number of additional components not shown in FIG. 1, depending on the details of the specific implementation.

Figure 2:
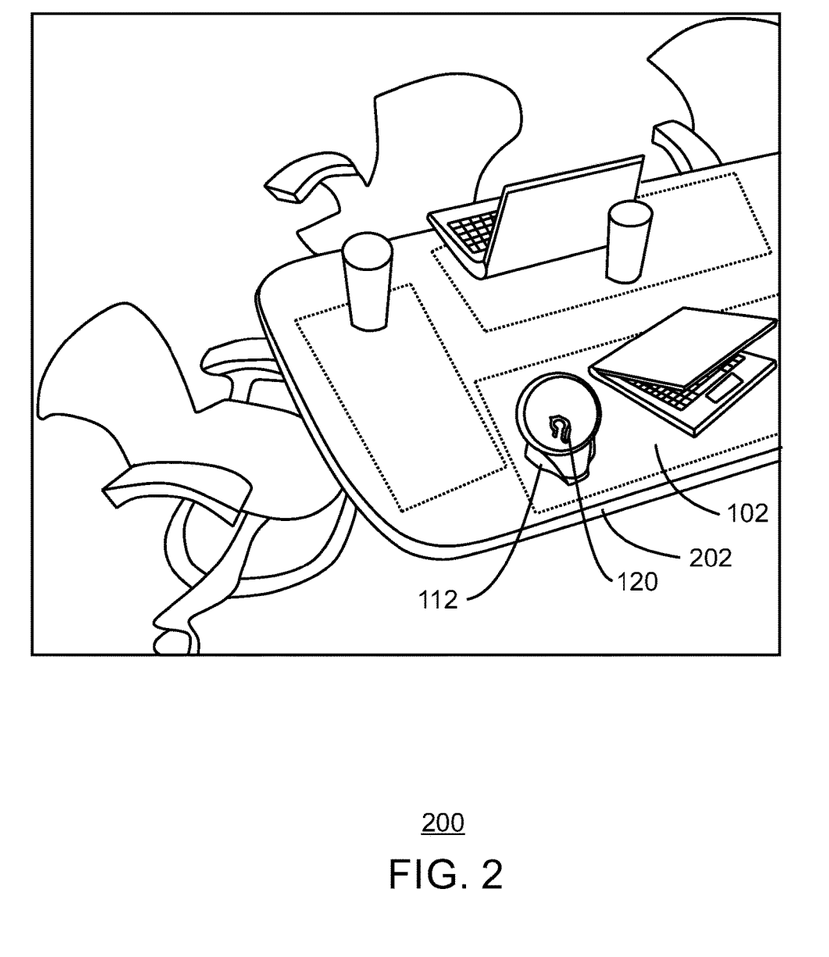
FIG. 2 is an illustration of a perspective view of the wireless power repeater in a wireless charging environment.

FIG. 2 is an illustration of a perspective view of the wireless power repeater in a wireless charging environment. A wireless charging environment 200 may include a surface 202, such as a table, as illustrated in FIG. 2. The surface 202 may include a PTU, such as the PTU 102 of FIG. 1 disposed on the surface 202, or under the surface 202, such that devices may be charged by placing them on or near the PTU 102. In this example, the wireless power repeater 112 of FIG. 1 is a bowl-shaped repeater. Turns for the Tx coil 116 of the wireless power repeater 112 are formed along the concave curve of the bowl shape, and resulting magnetic fields may be received by various shapes of devices, including the device 120.

Figure 3:
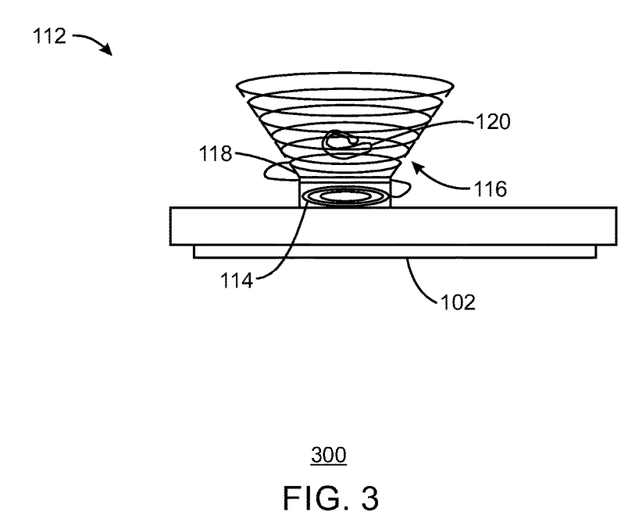
FIG. 3 is an illustration of a side view of the wireless power repeater placed on a PTU.

FIG. 3 is an illustration of a side view of the wireless power repeater placed on a PTU. In FIG. 3, the Tx coil 118 is illustrated as being formed along a bowl shape, similar to the bowl shape of the wireless power repeater 112 discussed above in regard to FIG. 2. The side view 300 of FIG. 3 illustrates the PTU 102 may generate a magnetic field received by the Rx coil 114 of the wireless power repeater generally indicates at 112. Between the Rx coil 114 and the Tx coil 112 of the wireless power repeater 112 is a phase shifting component, such as the phase shifting component 118 of FIG. 1. The wireless power repeater 112 may retransmit power from the PTU 102 by current propagating through the Tx coil 116, which may be received at the device 120.

Figure 4:
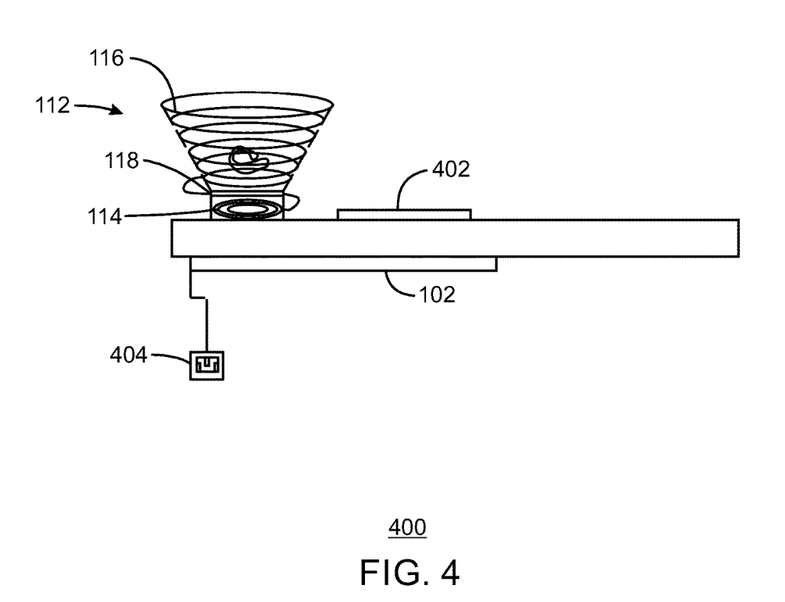
FIG. 4 is an illustration of a side view of the wireless power repeater and a second PRU being placed on the PTU.

FIG. 4 is an illustration of a side view of the wireless power repeater and a second PRU being placed on the PTU. The side view 400 of FIG. 4 similar to the side view of FIG. 3. However, in this example, the PTU 102 may charge another device 402 having a PRU, as well as the device 112 placed on the wireless power repeater, generally indicated at 112. FIG. 4 also illustrates that the PTU 102 may be connected to a plug 402, such as a wall or ground plug.

Figure 5:
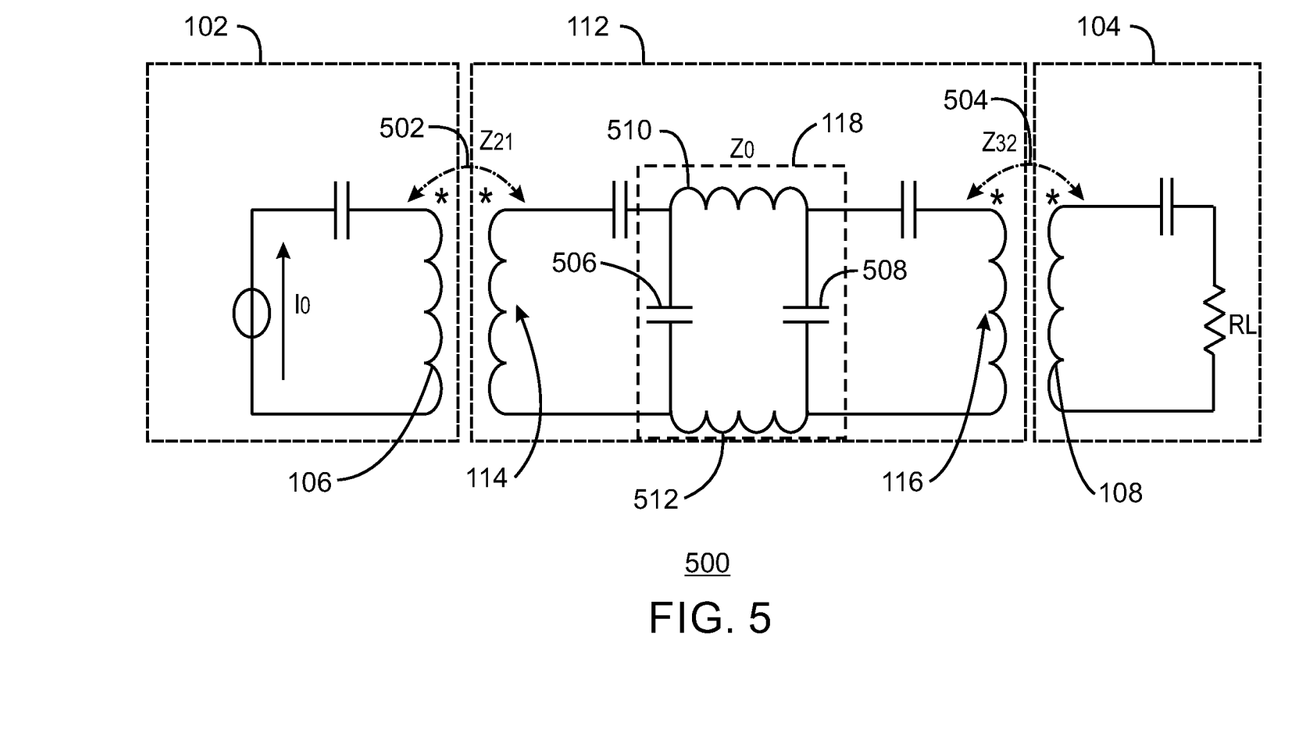
FIG. 5 is a diagram illustrating a circuit including a phase shifting component.

FIG. 5 is a diagram illustrating a circuit including a phase shifting component. Circuits associated with the PTU 102, the PRU 104, and the wireless power repeater 112 is indicated by dashed boxes in FIG. 5. In FIG. 5, an impedance $Z_{21}$ is associated with a coupling 502 between the PTU 102 and the Rx coil 114 of the wireless power repeater 112. An impedance $Z_{32}$ is associated with a coupling 504 between the Tx coil 116 of the wireless power repeater 112 and the Rx coil 108 of the PRU 104.

As discussed above in regard to FIG. 1, the wireless power repeater 112 may include a phase shifting component 118. In some cases, the phase shifting component 118 includes two capacitors 506 and 508 as well as two inductors 510 and 512. The phase shifting component 118 may be associated with a characteristic impedance $Z_0$. The phase shifting component 118 may result in a phase shift measured in fractions of wavelength, with characteristic impedance of $Z_0$, such as a quarter wavelength phase shift, to convert, or in some cases extend, charging coverage while maintaining compliance to the A4WP standard mentioned above.

An equivalent impedance of the wearable device on the passive repeater is, assuming the wearable coil is tuned to resonance, is presented below in Equation 1.

$$RL' = \frac{Z_{32}^2}{RL} \qquad \text{Eq. 1}$$

In Eq. 1, RL' is a load resistance associated with the device 120 and the Tx coil 116. The phase shifting component 118 then converts this equivalent load RL' to a load RL" to the Rx coil 114 of the wireless power repeater 112, as indicated by Equation 2.

$$RL'' = \frac{Z_0^2}{RL'} = RL \cdot \frac{Z_0^2}{Z_{32}^2} \qquad \text{Eq. 2}$$

The characteristic impedance $Z_0$ of the phase shifting component 118 can be selected to be the same (or very close) to the coupling between the Tx coil 116 and the Rx coil 108, such that $Z_0 \approx Z_{32}$. In other words, by carefully designing the Tx coil 116 and strategically selecting the characteristic impedance $Z_0$ of the phase shifting component 118, the wireless power repeater 112 may be configured to convert/extend a charging coverage while maintaining the compliance to A4WP standard.

Figure 6:
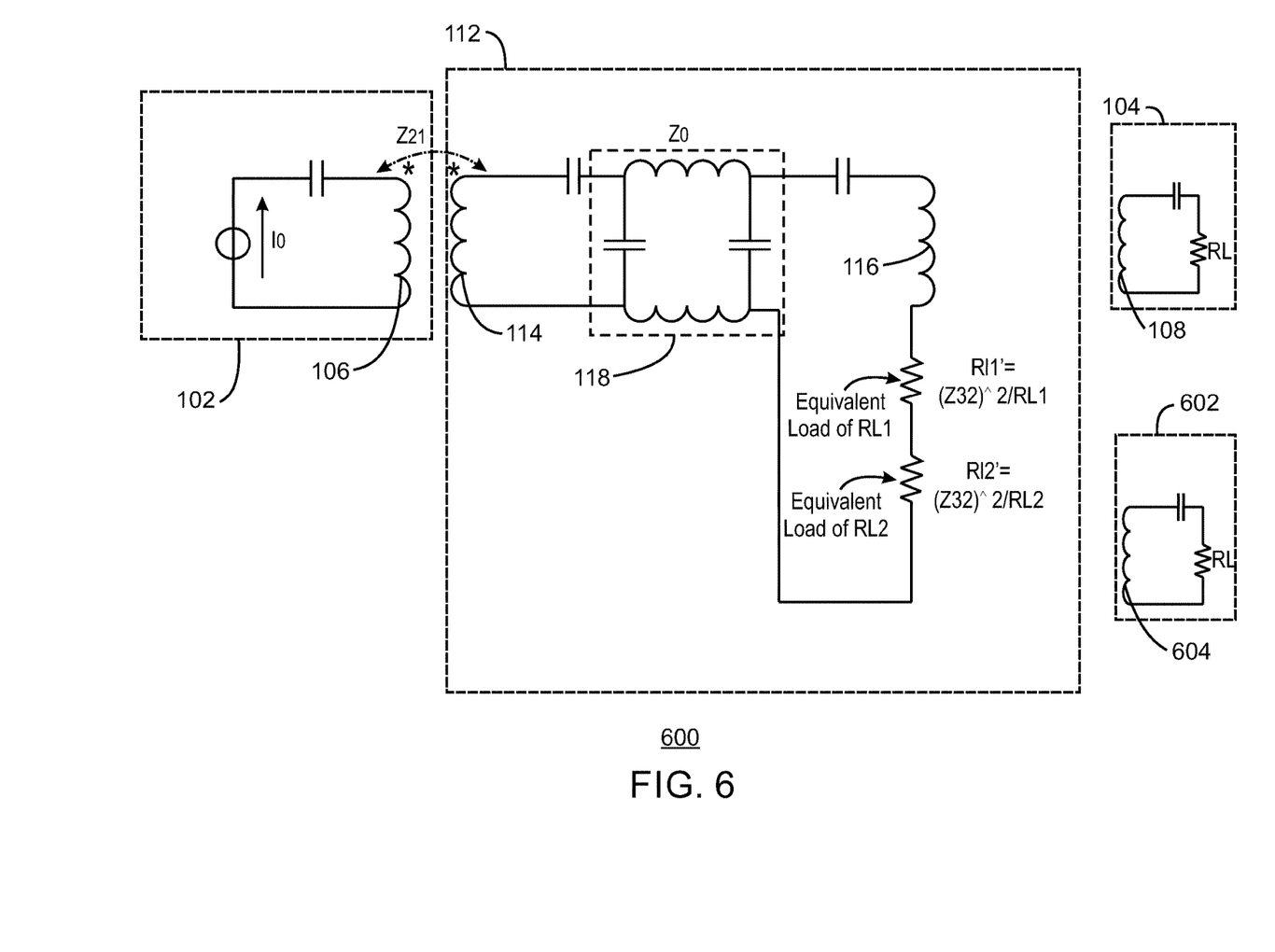
FIG. 6 is a diagram illustrating a circuit wherein multiple PRUs are placed on the wireless power repeater.

FIG. 6 is a diagram illustrating a circuit wherein multiple PRUs are placed on the wireless power repeater. In some cases, multiple PRUs, such as the PRU 104 of FIG. 1 may be charged by the wireless power receiver 112. As illustrated in FIG. 6, the PRU 104 is a first PRU. A second PRU 602 having a Rx coil 604 may be charged at the same time by power transmitted by the Tx coil 116 of the wireless power repeater indicated in the dashed box 112. The load resistances of each of the PRUs 104 and 602 are indicated as equivalent loads RL1' and RL2'.

Similar to FIG. 5, when PRUs 104 and 602 are tuned, the wireless power repeater 112 will present an equivalent load of RL" to the repeater as illustrated in Equation 3.

$$RL'' = \frac{Z_0^2}{RL_1' + RL_2'} = \frac{Z_0^2}{\frac{Z_{321}^2}{RL_1} + \frac{Z_{322}^2}{RL_2}} \approx \frac{Z_0^2 RL_1 RL_2}{Z_{32}^2(RL_1 + RL_2)} \approx \frac{RL_1 RL_2}{RL_1 + RL_2} \quad \text{Eq. 3}$$

Figure 7:
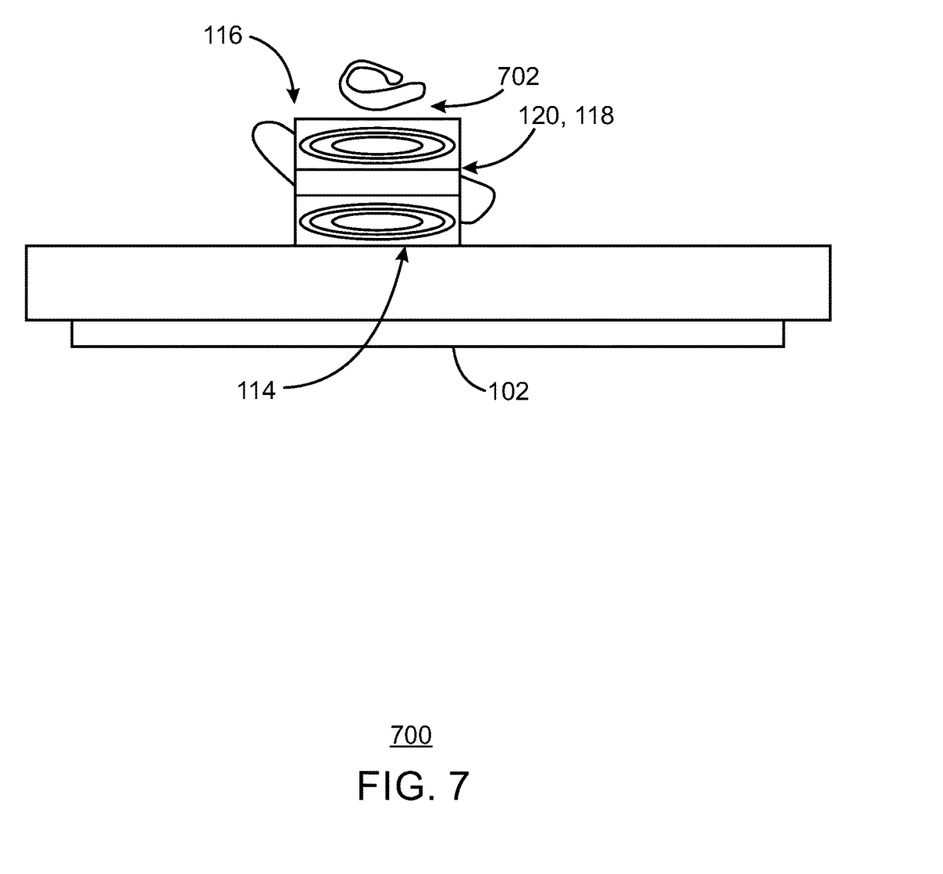
FIG. 7 is a diagram illustrating a device to be charged integrating the wireless power repeater.

FIG. 7 is a diagram illustrating a device to be charged integrating the wireless power repeater. As mentioned above, in some cases, the wireless power repeater 112 may be implemented as an integrated component of a device to be charged, such as the device 120 of FIG. 1. In this case, the device 120 may include the phase shifting component 118, and may be configured to receive charge for itself, as well as retransmit power a second device to be charged 702.

Figure 8:
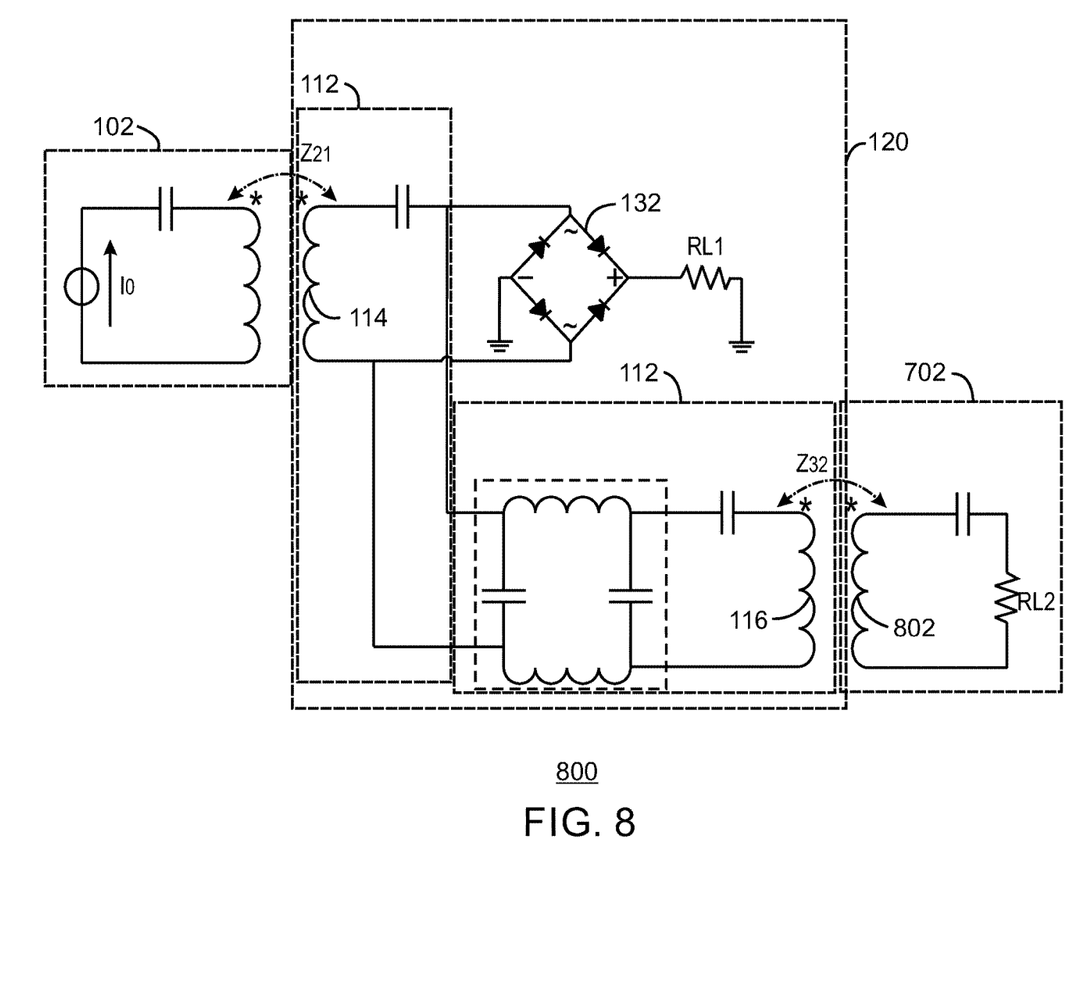
FIG. 8 is a diagram illustrating a circuit that may be implemented when the wireless power repeater is integrated into the PRU.

FIG. 8 is a diagram illustrating a circuit that may be implemented when the wireless power repeater is integrated into the PRU. The circuit 700 illustrates the wireless power repeater 112 being implemented within a device to be charged, such as the device 120 of FIG. 1 indicated at the dashed box 120. In this case, power received from the PTU 102 is propagated from the Tx coil 116 to another device to be charged, such as the device 702 of FIG. 7, having a Rx coil 802.

The power received from the PTU 102 at the Rx coil 114 may also be provided to a rectifier, such as the rectifier 132 of FIG. 1 discussed above. Therefore, the device 120 may charge itself as well as propagate power to be received at another device to be charged 802.

Figure 9:
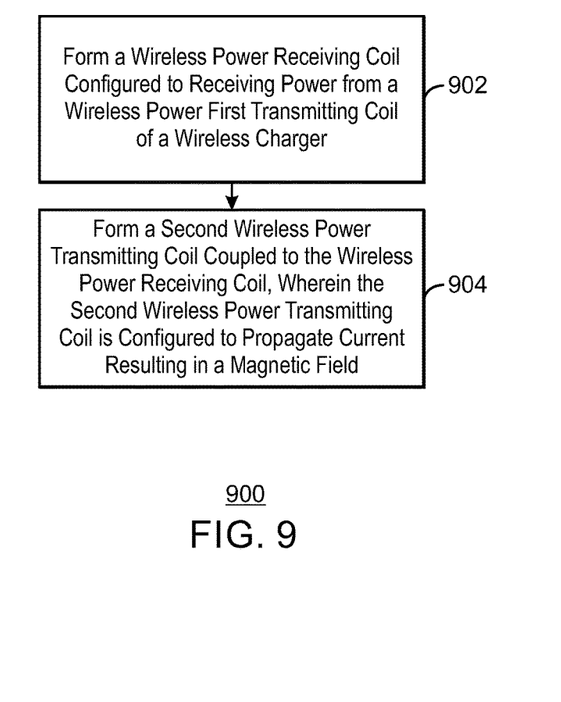
FIG. 9 is a flow diagram of a method for forming a wireless power repeater.

FIG. 9 is a flow diagram of a method for forming a wireless power repeater. At block 902, the method 900 may include forming a wireless power receiving coil configured to receive power from a wireless power first transmitting coil of a wireless charger. At block 904, the method may include forming a second wireless power transmitting coil coupled to the wireless power receiving coil, wherein the second wireless power transmitting coil is configured to propagate current resulting in a magnetic field.

In some cases, the wireless power receiving coil is a first wireless power receiving coil. In this case, a flux of the magnetic field is to be received at a second wireless power receiving coil of a device to be charged.

The method 900 may also include forming a phase shifting component coupling the wireless power receiving coil to the second wireless power transmitting coil. The phase shifting component is configured to generate an impedance inversion. The impedance inversion enables a constant current to be provided from the wireless charger. In some cases, the phase shifting component is configured to generate a quarter wavelength phase shift. Forming phase shifting component may include forming two inductors and forming two capacitors. Forming the phase shifting component may include coupling the wireless power receiving coil to the second wireless power transmitting coil via a transformer. Forming the phase shifting component may include coupling the wireless power receiving coil to the second wireless power transmitting coil via a transmission line of a length configured to generate the quarter wavelength phase shift.

In some cases, the method 900 includes embedding turns of the second wireless power transmitting coil a curve of a concave shaped device. In this case, the method 900 may include disposing the wireless power receiving coil is formed at a bottom or side of the concave shaped device.

In some cases, the wireless power receiving coil and the second wireless power receiving coil are formed in a first device to be charged. The first device to be charged is configured to be charged by the power provided by the first wireless power transmitting coil, as well as emit the magnetic field at the second wireless power transmitting coil based on a presence second device to be charged.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Example 1 includes an apparatus for wireless power repeating. The apparatus includes a first wireless power receiving coil configured to receive power from a first wireless power transmitting coil of a wireless charger. The apparatus also includes a second wireless power transmitting coil coupled to the first wireless power receiving coil, wherein the second wireless power transmitting coil is configured to propagate current resulting in a magnetic field.

Example 1 may include any combination of the cases discussed below. In some cases, a flux of the magnetic field is configured to be received at a second wireless power receiving coil of a chargeable device. The apparatus may include a phase shifting component coupling the first wireless power receiving coil to the second wireless power transmitting coil. The phase shifting component is configured to generate an impedance inversion. In some cases, the wireless charger can be configured to provide a constant current based on loads associated a presence of chargeable devices at the second wireless power receiving coil. The phase shifting component can be configured to generate a quarter wavelength phase shift.

In some cases, the phase shifting component may include a plurality of inductors and a plurality of capacitors. In some cases, the phase shifting component comprises a transformer. In some cases, the phase shifting component comprises a transmission line of a length configured to generate the quarter wavelength phase shift. In some cases, the phase shifting component may be any combination of the cases described above.

In some cases, the apparatus includes a portion having a concave shape. The wireless power receiving coil may be formed at a bottom or a side of the apparatus. Turns of the second wireless power transmitting coil may be embedded within the curve of the concave shape.

In some cases, the apparatus is integrated within a first chargeable device. The first chargeable device may configured to receive charge from the power provided by the first wireless power transmitting coil, and emit the magnetic field at the second wireless power transmitting coil based on a presence second chargeable device.

Example 2 includes a method. The method includes forming a first wireless power receiving coil configured to receive power from a first wireless power transmitting coil of a wireless charger. The method also includes forming a second wireless power transmitting coil coupled to the first wireless power receiving coil, wherein the second wireless power transmitting coil is configured to propagate current resulting in a magnetic field.

Example 2 may include any combination of the cases described below. In some cases, a flux of the magnetic field is to be received at a second wireless power receiving coil of a chargeable device. In some cases, the method includes forming a phase shifting component coupling the first wireless power receiving coil to the second wireless power transmitting coil, and wherein the phase shifting component is configured to generate an impedance inversion. The wireless charger may be configured to provide a constant current based on loads associated a presence of chargeable devices at the second wireless power receiving coil.

In some cases, the phase shifting component is configured to generate a quarter wavelength phase shift. Forming the phase shifting component may include forming multiple capacitors and forming multiple inductors. Forming the phase shifting component may include coupling the wireless power receiving coil to the second wireless power transmitting coil via a transformer. Forming the phase shifting component may include coupling the wireless power receiving coil to the second wireless power transmitting coil via a transmission line of a length configured to generate the quarter wavelength phase shift.

In some cases, the method includes embedding turns of the second wireless power transmitting coil a curve of a concave shaped device, and disposing the wireless power receiving coil is formed at a bottom or side of the concave shaped device.

In some cases, the wireless power receiving coil and the second wireless power receiving coil are formed in a first chargeable device. The first chargeable device may be configured to receive charge from the power provided by the first wireless power transmitting coil, as well as emit the magnetic field at the second wireless power transmitting coil based on a presence second chargeable device.

Example 3 includes a system for wireless power repeating. The system includes a first wireless power receiving coil configured to receive power from a first wireless power transmitting coil of a wireless charger. The system also includes a second wireless power transmitting coil coupled to the first wireless power receiving coil, wherein the second wireless power transmitting coil is configured to propagate current resulting in a magnetic field. The system also includes a phase shifting component coupling the first wireless power receiving coil to the second wireless power transmitting coil.

Example 3 may include any combination of the cases discussed below. In some cases, a flux of the magnetic field is configured to be received at a second wireless power receiving coil of a chargeable device. The phase shifting component is configured to generate an impedance inversion. In some cases, the wireless charger can be configured to provide a constant current based on loads associated a presence of chargeable devices at the second wireless power receiving coil. The phase shifting component can be configured to generate a quarter wavelength phase shift.

In some cases, the phase shifting component may include a plurality of inductors and a plurality of capacitors. In some cases, the phase shifting component comprises a transformer. In some cases, the phase shifting component comprises a transmission line of a length configured to generate the quarter wavelength phase shift. In some cases, the phase shifting component may be any combination of the cases described above.

In some cases, the system includes a portion having a concave shape. The wireless power receiving coil may be formed at a bottom or a side of the system. Turns of the second wireless power transmitting coil may be embedded within the curve of the concave shape.

In some cases, the system is integrated within a first chargeable device. The first chargeable device may configured to receive charge from the power provided by the first wireless power transmitting coil, and emit the magnetic field at the second wireless power transmitting coil based on a presence second chargeable device.

Example 4 includes a method. The method includes forming a first means for receiving wireless power configured to receive power from a first wireless power transmitting coil of a wireless charger. The method also includes forming a second means for transmitting wireless power coupled to the first means for receiving wireless power, wherein the second means for transmitting wireless power is configured to propagate current resulting in a magnetic field.

Example 4 may include any combination of the cases described below. In some cases, the first and second means are coils of a passive wireless power repeater. For example, the first means for wireless power receiving may be a Rx coil, and the second means for wireless power transmitting may be a Tx coil of a wireless power repeater.

In some cases, a flux of the magnetic field is to be received at a second wireless power receiving coil of a chargeable device. In some cases, the method includes forming a phase shifting component coupling the first means for receiving wireless power to the second means for transmitting wireless power, and wherein the phase shifting component is configured to generate an impedance inversion. The wireless charger may be configured to provide a constant current based on loads associated a presence of chargeable devices at the second wireless power receiving coil.

In some cases, the phase shifting component is configured to generate a quarter wavelength phase shift. Forming the phase shifting component may include forming multiple capacitors and forming multiple inductors. Forming the phase shifting component may include coupling the wireless power receiving coil to the second means for transmitting wireless power via a transformer. Forming the phase shifting component may include coupling the wireless power receiving coil to the second means for transmitting wireless power via a transmission line of a length configured to generate the quarter wavelength phase shift.

In some cases, the method includes embedding turns of the second means for transmitting wireless power a curve of a concave shaped device, and disposing the wireless power receiving coil is formed at a bottom or side of the concave shaped device.

In some cases, the wireless power receiving coil and the second wireless power receiving coil are formed in a first chargeable device. The first chargeable device may be configured to receive charge from the power provided by the first wireless power transmitting coil, as well as emit the magnetic field at the second means for transmitting wireless power based on a presence second chargeable device.

Example 5 includes an apparatus for wireless power repeating. The apparatus includes a first means for receiving wireless power configured to receive power from a first wireless power transmitting coil of a wireless charger. The apparatus also includes a second means for transmitting wireless power coupled to the first means for receiving wireless power, wherein the second means for transmitting wireless power is configured to propagate current resulting in a magnetic field.

Example 5 may include any combination of the cases discussed below. In some cases, the first and second means are coils of a passive wireless power repeater. For example, the first means for wireless power receiving may be a Rx coil, and the second means for wireless power transmitting may be a Tx coil of a wireless power repeater.

In some cases, a flux of the magnetic field is configured to be received at a second wireless power receiving coil of a chargeable device. The apparatus may include a phase shifting component coupling the first means for receiving wireless power to the second means for transmitting wireless power. The phase shifting component is configured to generate an impedance inversion. In some cases, the wireless charger can be configured to provide a constant current based on loads associated a presence of chargeable devices at the second wireless power receiving coil. The phase shifting component can be configured to generate a quarter wavelength phase shift.

In some cases, the phase shifting component may include a plurality of inductors and a plurality of capacitors. In some cases, the phase shifting component comprises a transformer. In some cases, the phase shifting component comprises a transmission line of a length configured to generate the quarter wavelength phase shift. In some cases, the phase shifting component may be any combination of the cases described above.

In some cases, the apparatus includes a portion having a concave shape. The wireless power receiving coil may be formed at a bottom or a side of the apparatus. Turns of the second means for transmitting wireless power may be embedded within the curve of the concave shape.

In some cases, the apparatus is integrated within a first chargeable device. The first chargeable device may configured to receive charge from the power provided by the first wireless power transmitting coil, and emit the magnetic field at the second means for transmitting wireless power based on a presence second chargeable device.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for wireless power repeating, comprising:
   a first wireless power receiving coil configured to receive power from a first wireless power transmitting coil of a wireless charger;
   a second wireless power transmitting coil coupled to the first wireless power receiving coil, wherein the second wireless power transmitting coil is configured to propagate current resulting in a magnetic field; and
   a phase shifting component to convert a first load resistance associated with the second wireless power transmitting coil to a second load resistance associated with the first wireless power receiving coil.

2. The apparatus of claim 1, wherein a flux of the magnetic field is configured to be received at a second wireless power receiving coil of a chargeable device.

3. The apparatus of claim 1, further comprising the phase shifting component coupling the first wireless power receiving coil to the second wireless power transmitting coil, and wherein the phase shifting component is configured to generate an impedance inversion.

4. The apparatus of claim 3, wherein the wireless charger is configured to provide a constant current based on loads associated a presence of chargeable devices at the second wireless power receiving coil.

5. The apparatus of claim 3, wherein the phase shifting component is configured to generate a quarter wavelength phase shift.

6. The apparatus of claim 3, wherein the phase shifting component comprises:
   a plurality of inductors; and
   a plurality of capacitors.

7. The apparatus of claim 3, wherein the phase shifting component comprises a transformer.

8. The apparatus of claim 7, wherein the phase shifting component comprises a transmission line of a length configured to generate the quarter wavelength phase shift.

9. The apparatus of claim 1, wherein the apparatus comprises a portion having a concave shape, and wherein the wireless power receiving coil is formed at a bottom or a side of the apparatus, and wherein turns of the second wireless power transmitting coil are embedded within the curve of the concave shape.

10. The apparatus of claim 1, wherein the apparatus is integrated within a first chargeable device, and wherein the first chargeable device is configured to receive charge from the power provided by the first wireless power transmitting coil, and emit the magnetic field at the second wireless power transmitting coil based on a presence second chargeable device.

11. A method for wireless power repeating, comprising:
   forming a first wireless power receiving coil configured to receive power from a first wireless power transmitting coil of a wireless charger;
   forming a second wireless power transmitting coil coupled to the first wireless power receiving coil, wherein the second wireless power transmitting coil is configured to propagate current resulting in a magnetic field; and
   forming a phase shifting component configured to convert a first load resistance associated with the second wireless power transmitting coil to a second load resistance associated with the first wireless power receiving coil.

12. The method of claim 11, wherein a flux of the magnetic field is to be received at a second wireless power receiving coil of a chargeable device.

13. The method of claim 11, further comprising forming the phase shifting component coupling the first wireless power receiving coil to the second wireless power transmitting coil, and wherein the phase shifting component is configured to generate an impedance inversion.

14. The method of claim 13, wherein the wireless charger is configured to provide a constant current based on loads associated a presence of chargeable devices at the second wireless power receiving coil.

15. The method of claim 13, wherein the phase shifting component is configured to generate a quarter wavelength phase shift.

16. The method of claim 13, wherein forming the phase shifting component comprises:
   forming a plurality of inductors; and
   forming a plurality of capacitors.

17. The method of claim 13, wherein forming the phase shifting component comprises coupling the wireless power receiving coil to the second wireless power transmitting coil via a transformer.

18. The method of claim 17, wherein forming the phase shifting component comprises coupling the wireless power receiving coil to the second wireless power transmitting coil via a transmission line of a length configured to generate the quarter wavelength phase shift.

19. The method of claim 11, further comprising:
   embedding turns of the second wireless power transmitting coil a curve of a concave shaped device; and
   disposing the wireless power receiving coil is formed at a bottom or side of the concave shaped device.

20. The method of claim 11, wherein the first wireless power receiving coil and the second wireless power transmitting coil are formed in a first chargeable device, and wherein the first chargeable device is configured to receive charge from the power provided by the first wireless power transmitting coil, as well as emit the magnetic field at the second wireless power transmitting coil based on a presence second chargeable device.

21. A system for wireless power repeating, comprising:
   a first wireless power receiving coil configured to receive power from a first wireless power transmitting coil of a wireless charger; and
   a second wireless power transmitting coil coupled to the first wireless power receiving coil, wherein the second wireless power transmitting coil is configured to propagate current resulting in a magnetic field; and
   a phase shifting component coupling the first wireless power receiving coil to the second wireless power transmitting coil, and wherein the phase shifting component is configured to generate an impedance inversion, and wherein the phase shifting component is configured to convert a first load resistance associated with the second wireless power transmitting coil to a second load resistance associated with the first wireless power receiving coil.

22. The system of claim 21, wherein a flux of the magnetic field is to be received at a second wireless power receiving coil of a chargeable device.

23. The system of claim 21, wherein the impedance inversion is associated with a quarter wavelength phase shift.

24. The system of claim 21, wherein a flux of the magnetic field is to be received at a second wireless power receiving coil of a chargeable device, and wherein the phase shifting component is configured to boost power received at the chargeable device.

25. The system of claim 21, wherein the system is a component of a first chargeable device, and wherein the first chargeable device is configured to be charged by the power provided by the first wireless power transmitting coil, as well as emit the magnetic field at the second wireless power transmitting coil based on a presence second chargeable device.

* * * * *